US005869784A

United States Patent [19]

Shinchi

[11] Patent Number: 5,869,784

[45] Date of Patent: Feb. 9, 1999

[54] COVERED WIRE CONNECTION STRUCTURE

[75] Inventor: Akira Shinchi, Shizuoka-ken, Japan

[73] Assignee: Yazaki Corporation, Tokyo, Japan

[21] Appl. No.: 858,694

[22] Filed: May 19, 1997

[30] Foreign Application Priority Data

Jun. 4, 1996 [JP] Japan .................................... 8-141869

[51] Int. Cl.[6] .............................. H01R 4/00; H02G 15/08

[52] U.S. Cl. ........................................ 174/84 R; 174/94 R

[58] Field of Search ................................ 174/84 R, 94 R

[56] References Cited

U.S. PATENT DOCUMENTS

| | | | |
|---|---|---|---|
| 2,250,156 | 7/1941 | Ferguson | 174/84 R X |
| 2,760,798 | 8/1956 | Evans | 174/94 R X |
| 3,418,444 | 12/1968 | Ruehlemann | 174/84 R X |
| 3,510,624 | 5/1970 | Bennett | 174/84 R X |
| 4,405,827 | 9/1983 | Mixon, Jr. | 174/94 R |
| 4,878,969 | 11/1989 | Janisch | 174/84 R X |
| 5,584,122 | 12/1996 | Kato et al. | 174/84 R X |

FOREIGN PATENT DOCUMENTS 7-320842 12/1995 Japan .

*Primary Examiner*—Dean A. Reichard
*Attorney, Agent, or Firm*—Oblon, Spivak, McClelland, Maier & Neustadt, P.C.

[57] ABSTRACT

Covered wires are overlapped with each other at an overlapping portion and pinched by a pair of resin chips. Cover portions are melted by ultrasonic vibration and conductive wire portions are conductively contacted with each other by pressing from outside of the resin chips. A pair of the resin chips are melt-fixed to seal the overlapping portion S. The resin chips have main melting portions which are melted with each other to pinch and seal the overlapping portion S, auxiliary melting portions which are melted with each other such that cover portions of covered wires introduced from the main melting portions are pinched and cover portion removing portions formed in the auxiliary melting portions to melt and extrude the cover portion. Thus, by this covered wire connection structure, it is possible to provide an excellent melting performance and achieve enhancement of melting force between the resin chips and improvement of covering performance for conductive wire portions.

8 Claims, 3 Drawing Sheets

COVERED WIRE CONNECTION STRUCTURE

BACKGROUND OF THE INVENTION

This invention relates to a connection method and structure for connecting covered wires with each other or connecting a covered wire to another member.

As a conventional connection structure for this kind of covered wires, a design proposed by this inventor (see Japanese Laid-Open Patent Application No. 7-320842) will be described.

For connecting two covered wires the outer periphery of which is coated with a cover portion made of resin, at their intermediate connection portions, a pair of resin chips which are of resin material, a horn for producing ultrasonic vibration, and an anvil for supporting the covered wires and resin chips at the time of connection are utilized. The anvil includes a base stand and a support portion projecting from the base stand. The support portion is designed in a substantially cylindrical shape. The support portion has a bore portion which is opened at the opposite side to the base stand side. Two-pairs of grooves are formed on the peripheral wall of the support portion so as to cross with each other substantially at the center of the bore portion. The four grooves are formed so as to open on the same side as the bore portion, extending along the projection direction of the support portion and intercommunicate with one another through the bore portion.

The pair of resin chips are designed in a disc shape having a slightly smaller outer diameter than the diameter of the bore portion of the anvil. Furthermore, an end face of a head portion of the horn is designed in a disc shape having an outer diameter which is substantially equal to or slightly smaller than that of the resin chips.

In order to connect the two covered wires to each other, both of the covered wires are overlapped with each other at the overlapping portions thereof and the overlapped connection portions are pinched by the pair of resin chips from the upper and lower sides of the connection portions. Specifically, one of the resin chips (the resin chip at the lower side) is inserted into the bore portion of the anvil such that the melting surface thereof is directed upward. Then, one covered wire is inserted into the pair of confronting grooves from the upper side of the inserted resin chip. Then, the other covered wire is inserted into the other pair of the confronting grooves. Finally, the other (upper side) resin chip is inserted such that the melting surface is directed downward. The covered wires are arranged in the bore portion so that the respective connection portions thereof cross each other at the center of the bore portion. Through this arrangement, the connection portions of the covered wires are pinched substantially at the center of the melting surfaces of the upper and lower resin chips respectively in the overlapping direction.

Subsequently, the cover portions at the connection portions of the covered wires are melted so as to be dispersed by ultrasonic vibration. Furthermore, the conductive wire portions (core) of the covered wires are conductively contacted with each other at the overlapping portions by pressing the covered wires from the outside of the resin chips. Thereafter, the pair of the resin chips are mutually melt-fixed at the melting surfaces to seal the overlapping portions.

Specifically, the head portion of the horn is inserted into the bore portion from the upper side of the finally-inserted upper (other) resin chip and placed on the upper resin chip to excite and press the connection portions of the covered wires from the outside of the upper and lower resin chips between the horn and the anvil. The cover portions are first melted and the conductive wire portions of the covered wires are exposed at the overlapping portions between the resin chips. At this time, the melted cover portions are extruded from the center side of the resin chips toward the outside thereof because the connection portions are pressed from the upper and lower sides, so that the conductive wire portions are more excellently exposed and surely conductively contacted with each other. Like the press direction, the direction of the excitation of the connection portions is set to be coincident with the overlapping direction of the covered wires, so that the action of extruding the melted cover portions from the center side of the resin chips to the outside thereof is promoted.

When the pressing and exciting operation on the connection portions is further continued after the melting of the cover portions, the resin chips are melted and the confronting melting surfaces of the resin chips are melt-fixed to each other. In addition, the outer peripheral surface portions of the cover portions which are adjacent to the conductively contacted conductive wire portions and the resin chips are melt-fixed. With this operation, the outer peripheral portions of the conductively-contacted conductive wire portions are kept to be coated with the resin chips.

However, in the connection structure described above, melted resin which flows out of a gap between the melting surfaces and when the resin chips are melted flows into groove portions so that it is hardened. At this time, downstream portions of the covered wires are near or in contact with bottoms of the groove portions. There are not sufficient spaces formed to allow melted resin to flow therein and this accompanied by increase of the amount of flow out, causes the melted resin to be deposited upstream of the covered wires (opening sides of the groove portions). Thus, if the cover portions are melted by high temperature melted resin, conductive wire portions are covered with the melted resin upstream of the covered wires where the melted resin is deposited, but not downstream where the melted resin is difficult to be deposited, the conductive wire portion remains exposed after the cover portions are melted. As a result, there may occur through holes which go through the cover portion or the conductive wire portion may remain exposed. If the conductive wire portions remain exposed, water or the like entering the connection portions in the resin chips may corrode the conductive wire portions, thereby inducing an increase in electric resistance. Further, due to a difference in pressure between the inside and outside of the covered wire, water or the like entering the inside of the covered wire 1 may reach a connector or the like provided on a side opposite to the overlapping portion S of the covered wire 1 thereby inducing a shortcircuit.

Thus, it is necessary to limit the pressing and excitation force by the horn in order to suppress the amount of flow out of the melted resin. However, it was difficult to achieve enhancement of the melting force between the resin chips and improvement of the covering performance of the conductive wire portion by the resin chips at the same time.

SUMMARY OF THE INVENTION

It is therefore an object of the present invention to provide a covered wire connection structure capable of achieving enhancement of melting force between the resin chips and improvement of covering performance for the conductive wire portion.

In order to achieve the above object, according to the present invention, there is provided a covered wire connection structure of conductively connecting members at least one of which is a covered wire having a conductive wire portion and a cover portion formed by coating resin around an outer periphery of the conductive wire portion, the structure being formed by overlapping the members with each other and pinching an overlapping portion of the members between a pair of resin chips, pressurizing and exciting the overlapping portion pinched by the resin chips using an ultrasonic vibration welding apparatus so as to melt and disperse the cover portion, thereby to expose the conductive wire portion and electrically conductively connect the conductive wire portions of the members at the overlapping portion and so as to melt-fix the pair of resin chips to seal the connected overlapping portion of the members with the melted resin chips, characterized in that the pair of the resin chips have main melting portions which are melt-fixed to each other to seal the overlapping portion (connection portions) as the melting portions pinch the connection portions, auxiliary melting portions which are melt-fixed to each other so as to pinch the cover portions of the covered wires introduced from the main melting portions, and cover portion removing portions formed in the auxiliary melting portions for melting the cover portions and extruding the melted cover portions in a direction of the covered wire.

The pair of the resin chips may have waterproofing groove portions into which the cover portions melted and extruded by the cover portion removing portions are filled and hardened.

The auxiliary melting portions may comprise an auxiliary melting surface which is to be melt-fixed to a mating resin chip and a wire containing groove formed on the auxiliary melting surface so as to indent therefrom having an internal peripheral surface of substantially the same diameter as an external diameter of the covered wire, the cover portion removing portions may be formed so as to protrude from the internal peripheral surface of the wire containing grooves, and the waterproofing groove portions may be formed so as to indent on the internal peripheral surface of the wire containing groove along the external circumference of the covered wires.

The waterproofing groove portions may be formed in a volume smaller than the volume of the cover portion extruded.

The waterproofing portions may be disposed at least on a side opposite to the main melting portions of the cover portion removing portions.

According to the construction described above, both of the members are overlapped with each other at the connection portions and the overlapped connection portions are pinched by a pair of the resin chips. The cover portions are melted and dispersed by ultrasonic vibration and at the same time, are pressed from the outside of the resin chips. With such a simple method, both the members can be conductively contacted with each other at the connection portions and further both the members can be conductively connected with each other by a simple operation.

After both of the members are conductively contacted with each other at the connection portions, the connection portions are sealed by melting the main melting portions of a pair of the resin chips. Thus, with melted and hardened resin chips, a high mechanical strength can be obtained at the connection portions.

The covered wires introduced from the main melting portions are pinched by the auxiliary melting portions and the auxiliary melting portions are melt-fixed. The cover portions pinched by the auxiliary melting portions are melted by the cover portion removing portions and extruded in a direction of the extension of the covered wire. The extruded cover portions are filled in the waterproofing groove portions and hardened. At the auxiliary melting portions which serve as an introducing end from the resin chips for the covered wires, the extruded cover portions are hardened integrally with the outer peripheral surface of the cover portions remaining in the waterproofing groove portions thereby exerting the same function as an elastic packing. Thus, the conductive wire portions of the covered wire at the introducing ends from the resin chips are completely covered with the cover portion remaining in the waterproofing groove portion and the cover portion extruded which functions as an elastic packing.

Further, because the auxiliary melting portions are also melt-fixed as well as the main melting portions, a higher mechanical strength can be obtained.

The conductive wire portion of the covered wire at the introducing end from the resin chips are covered with the cover portions remaining in the waterproofing groove portions. Entrance of water or the like into the resin chips from outside is blocked by the cover portion extruded which functions as an elastic packing. Further, the auxiliary melting portions as well as the main melting portions are melt-fixed, thereby being capable of achieving enhancement of the melting force between the resin chips and improvement of the covering performance (enhancement of waterproofing performance) for the connected portions by the resin chips.

Further, by forming the waterproofing groove portion in a smaller volume than that of the extruded cover portion, the shape of the cover portion to be extruded and hardened can be formed into the groove shape of the waterproofing groove portion.

Further, by providing a side opposite to the main melting portion in the cover portion removing portion with the waterproofing groove portion, the cover portion which is hardened in the waterproofing groove portion and functions like an elastic packing and may be disposed on the side opposite to the main melting portion at the introducing end in which the covered wire is introduced from the resin chips.

One of the pair of the resin chips may have a lid body shaped thin plate; the main melting portion and auxiliary melting portions of the one resin chip may be disposed so as to protrude from a surface of the lid body; the other resin chip of the pair of the resin chips may have a chip body shaped thick plate; the chip body may have a surface which is to face the surface of the lid body when overlapped with the one resin chip and to be melt-fixed to the surface thereof; the main melting portion and auxiliary melting portions of the other resin chip may be disposed so as to protrude from the surface of the chip body; the auxiliary melting portion of the other resin chip may be formed in groove shape containing the auxiliary melting portion of the one resin chip when overlapped with the one resin chip; and the connection portions may be pressed by the main melting portions in a sealed space in the resin chips formed by melting the lid body and the chip body such that the connection portions are conductively connected to each other.

According to the construction described above, the conductively contacted connection portions are sealed by the main melting portions and further sealed by a sealing space formed by melting the lid body and the chip body such that the connection portions are sealed in double fashion.

The cover portion removing portions may be melted by the pressing and excitation, and filled in between a plurality of core wires composing the conductive wire portion.

According to the construction described above, when the auxiliary melting portions of the resin chips are melt-fixed, the melted cover portion removing portions are charged in between the core wires. As a result, gap portions formed between the cover portion of the covered wire and the core wire and gap portions formed between the core wires are filled with the melted cover portion removing portions to block the gap portions. Thus, it is possible to obtain waterproofing effects inside of the covered wire. Thus, when connecting the covered wire to a waterproofed portion and non-waterproofed portion, it is possible to secure waterproofing performance in the waterproofed portion by a simple and cheap method and construction without providing the non-waterproofed portion with waterproofing structure.

DESCRIPTION OF THE PREFERRED EMBODIMENTS

Hereinafter, an embodiment of the present invention will be described with reference to the accompanying drawings.

Figure 1:
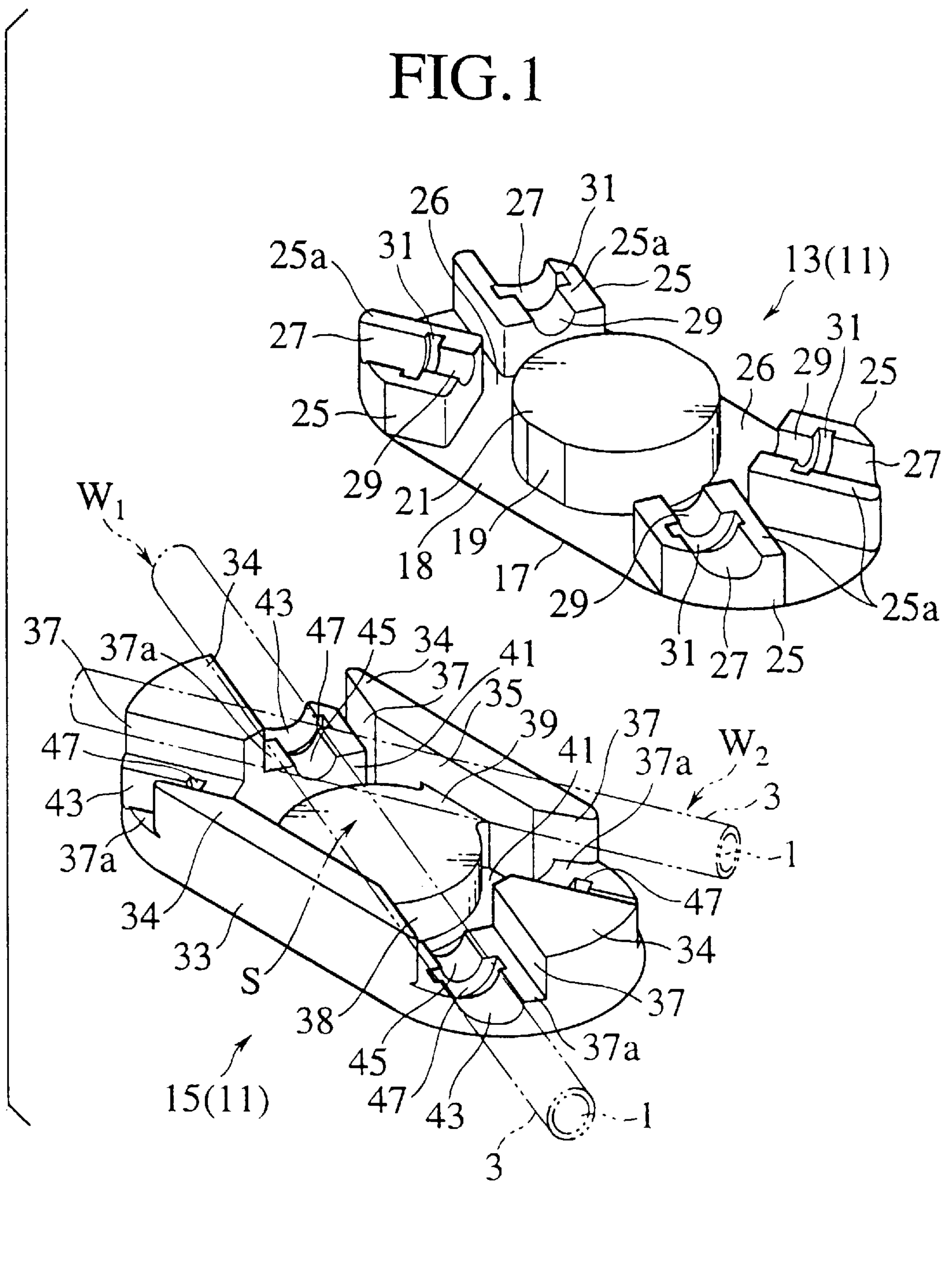
FIG. 1 is a perspective view showing a connection structure of covered wires according to the instant embodiment showing a state in which the upper and lower resin chips are separated.
Figure 2:
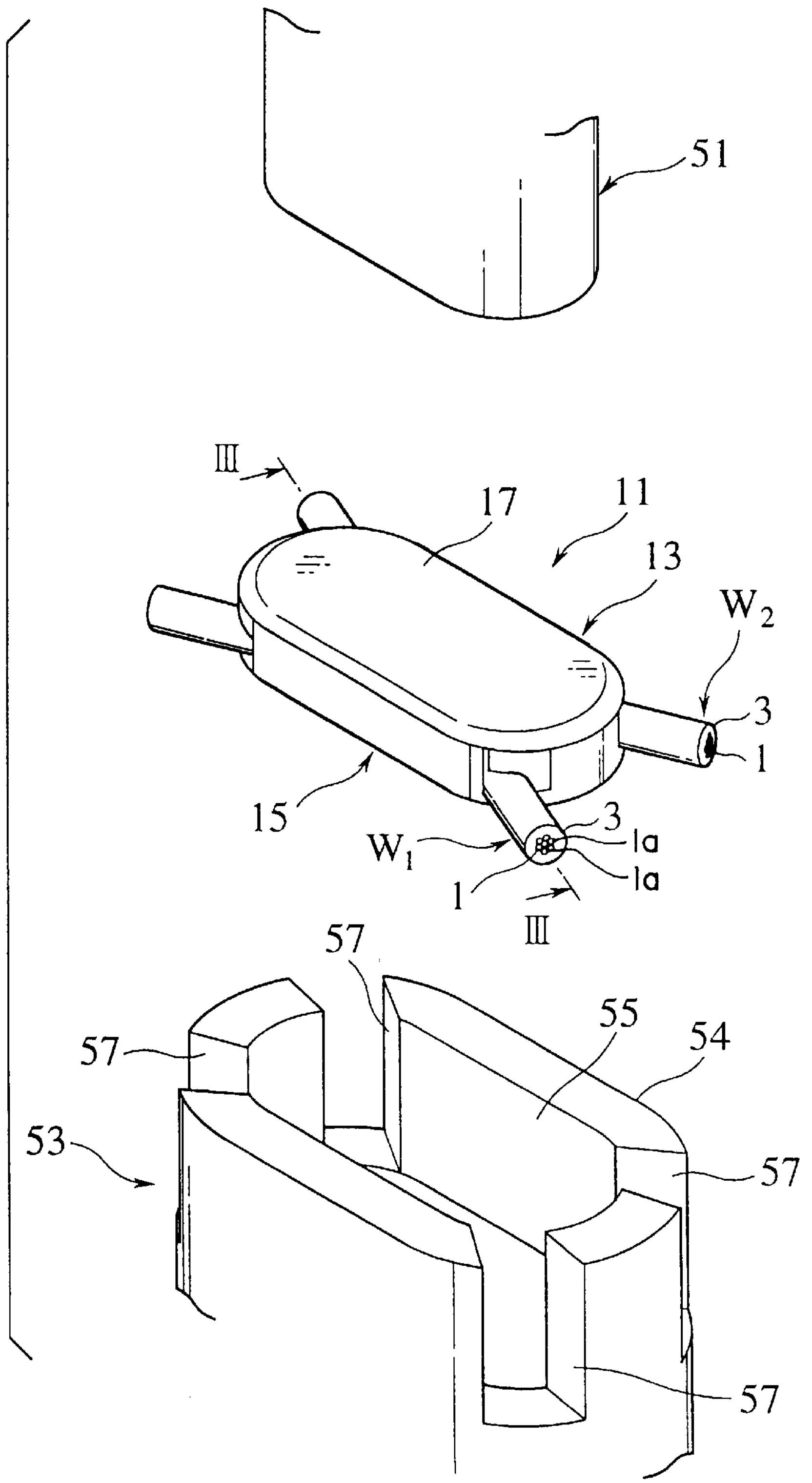
FIG. 2 is a perspective view showing a covered wire connection structure according to the instant embodiment showing a state in which the upper and lower resin chips are fit together through their melting surfaces.
Figure 3A:
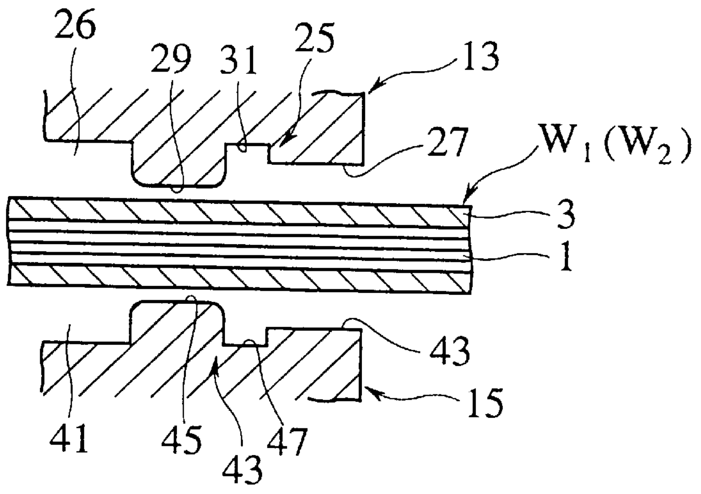
FIG. 3A shows a state just before the connection is conducted.
Figure 3B:
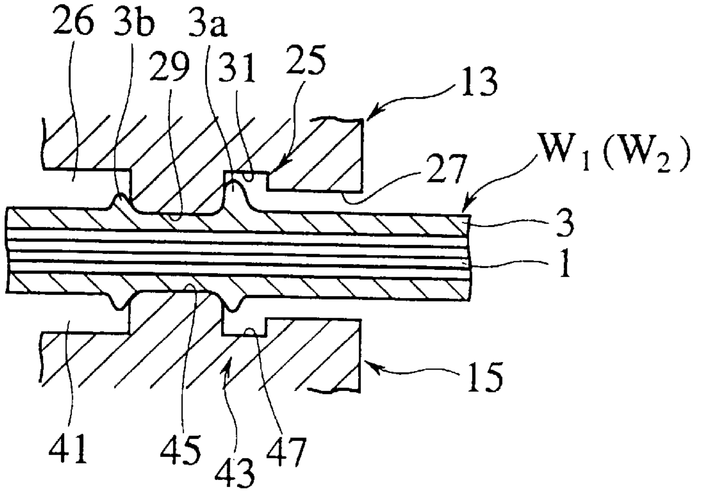
FIG. 3B shows a state during the connection.
Figure 3C:
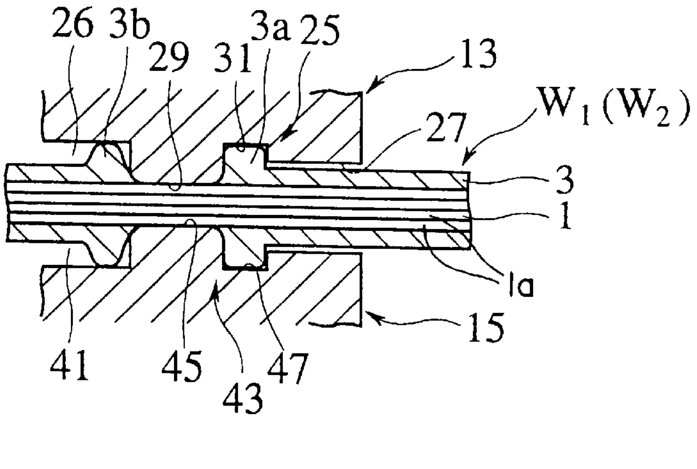
FIG. 3C shows a state after the connection.

FIG. 1 is a perspective view of a state in which upper and lower resin chips are separated showing a covered wire connection structure according to the instant embodiment of the present invention. FIG. 2 is a perspective view of a state after the connection showing a means for obtaining a covered wire connection structure according to the instant embodiment. FIGS. 3A–3C are sectional views taken along the lines III—III in FIG. 2. FIG. 3A shows a state just before the connection is conducted, FIG. 3B shows a state during the connection and FIG. 3C shows a state after the connection.

According to the instant embodiment shown in FIG. 1, two covered wires W1, W2 each of which comprises a conductive wire portion 1 and a cover portion 3 which is formed of resin and coated around the outer periphery of the conductive wire portion, are conductively connected to each other at connection portions S thereof as shown in FIG. 1.

First, a connection method for the covered wires W1, W2 according to the instant embodiment will be described. For the connection of the two covered wires W1, W2 are used a pair of resin chips 13, 15 serving as a resin material 11, a horn 51 for producing ultrasonic vibration as shown in FIG. 2 and an anvil 53 for supporting the covered wires W1, W2 and the resin chips 13, 15 when the connection between the covered wires is performed. The anvil 53 includes a base stand (not shown) and a support portion 54 projecting from the base stand. The support portion 54 is designed in a shape having a substantially oval cross section. The support portion 54 has a bore portion 55 which is opened at the opposite side to the base stand side (at the upper side in the same Figure). Two pairs of grooves 57 (four) are formed on the peripheral wall of the support portion 54 so as to cross with each other substantially at the center of the bore portion 55. The four grooves 57 are formed so as to open on the same side as the bore portion 55, extending along the projection direction of the support portion 54 and intercommunicate with one another through the bore portion 55.

As shown in FIG. 1, one (upper) resin chip 13 has a lid body 17 formed in substantially oval shaped, thin plate form having a slightly smaller external periphery than the bore portion 55 (see FIG. 2) of an anvil 53, a main melting portion 19 formed in a substantially cylindrical shape and four auxiliary melting portions. The main melting portion 19 and the auxiliary melting portions 25 are disposed so as to integrally protrude from a surface 18 on one side (upper side in FIG. 1) of the lid body 17. The main melting portion 19 is disposed substantially in the center of the surface 18 of the lid body 17. The auxiliary melting portions 25 are disposed at four positions around the main melting portion 19 such that they are located at four corners of the lid body 17. A gap portion 26 for separating the main melting portion and the auxiliary melting portions is provided between the main melting portion 19 and the auxiliary melting portions 25. The main melting portion 19 has a main melting surface 21 which pinches the overlapping portions S with a main melting surface 39 of a lower resin chip 15 described later such that it is melted together with the lower main melting surface 39. The auxiliary melting portions 25 have upper auxiliary melting surfaces 25*a* which are melted together with lower auxiliary melting surfaces 37*a* described later.

The other (lower) chip 15 has a chip body 33 formed in substantially oval shaped, thick plate form having a slightly smaller external periphery than the internal bore portion 55 (see FIG. 2) of the anvil 53 like the upper resin chip 13, a lower main melting portion 38 formed in a substantially cylindrical shape provided corresponding to the upper main melting portion 19, and lower auxiliary melting portions 37 provided corresponding to the upper auxiliary melting portions 25. The lower auxiliary melting portion 37 is a groove structure formed in a concave shape on a surface 34 on a side (upper side in FIG. 1) of the chip body 33 such that the upper auxiliary melting portion 25 is contained therein when the upper and lower resin chips 13, 15 are fit together. A bottom surface of the lower auxiliary melting portion 37 composes the aforementioned lower auxiliary melting surface 37*a*. A lower main melting portion 38 is formed below the surface 34 of the chip body 33 such that its surface opposes the upper main melting surface 21 when the upper and lower resin chips 13, 15 are fit together. A gap portion 41 for separating the main melting portion 38 and the auxiliary melting portion 37 is disposed between the main melting portion 38 and the auxiliary melting portion 37. By this gap portion 41, the main melting portion 38 is formed in a substantially cylindrical shape like the upper side.

The respective auxiliary melting portions 25, 37 have cover portion removing portions 29, 45 for melting the cover portion 3 pinched by the auxiliary melting portions 25, 37 and pushing it out in a direction of the extension of the covered wire W1 or W2 and waterproofing groove portions 31, 47 in which the pushed cover portion 3 is filled and hardened. The upper and lower auxiliary melting surfaces 25*a*, 37*a* have concave wire containing grooves 27, 43 having a semicircular shaped internal surface having the same diameter as the external diameter of the covered wires W1, W2. The aforementioned cover portion removing portions 29, 45 are disposed so as to protrude from the internal surface of the wire containing grooves 27, 43. The aforementioned waterproofing groove portions 31, 47 are disposed so as to indent from the internal surface of the wire containing grooves 27, 43 along the external surfaces of the covered wires W1, W2. The waterproofing groove portions 31, 47 are disposed in the vicinity of sides opposite to the main melting portions of the cover portion removing portions 29, 45 and formed in a smaller volume than that of the cover portion 3*a* pushed out (see FIGS. 3A and 3C). The waterproofing groove portions 31, 47 may be provided on both sides relative to the cover portion removing portions 29, 45 although they are permitted to be provided on only one side as described here.

As shown in FIG. 2, the bottom portion of the horn 51 is formed so as to be of a substantially oval shape having substantially the same or slightly smaller outer periphery than that of the resin chips 13, 15 (lid body 17, chip body 33).

The resin chips 13, 15 are made of acrylic resin, ABS (acrylonitrile-butadiene-styrene copolymer) resin, PC (polycarbonate) resin, PVC (polyvinyl chloride) resin, PE (polyethylene) resin, PEI (polyetherimide), PBT (polybuthylene terephtalate) or the like. The material is harder than vinyl chloride for use in the cover portion 3. With respect to the suitability of these resins for use as the resin chips 13, 15, the applicability can be recognized in all the resins in terms of the conductivity and conductivity stability and if judging from appearance and insulation performance as well, particularly PEI resins and PBT resins are suitable.

When connecting the two covered wires W1, W2, both the covered wires W1, W2 are overlapped with each other at the connection portions (overlapping portion) S and the overlapped connection portions S are pinched by a pair of the resin chips 13, 15 from above and below so as to contain portions of the covered wires W1, W2 except the connection portions S in the wire containing grooves 27, 43. Concretely, the resin chip 15 is inserted into the bore portion 55 of the anvil 53 such that one surface 34 is directed upward. Then, one covered wire W1 is inserted into the wire containing groove 47 which is located in one diagonal position and then the other covered wire W2 is inserted into the wire containing groove 47 which is located in the other diagonal position. Finally, the other (upper) resin chip 13 is inserted with one surface 18 directed downward such that the respective wire containing grooves 27 coincide with the covered wires W1 and W2. Both the covered wires W1, W2 are arranged such that the connection portions S cross with each other in the center of the main melting surfaces 21, 39. Consequently, the connection portions S are pinched by the main melting surfaces 21, 39 of the upper and lower resin chips 13, 15 such that the overlapped connection portions S are located in the center of the main melting surfaces 21, 39.

Subsequently, the cover portions 3 at the connection portions S of the covered wires are melted so as to be dispersed by ultrasonic vibration. Furthermore, the conductive wire portions (core) of the covered wires W1, W2 are conductively contacted with each other at the overlapping portions S by pressing the covered wires from the outside of the resin chips 13, 15. Thereafter, the pair of the resin chips 13, 15 are mutually melted at the melting surfaces 21, 39, the auxiliary melting surfaces 25*a*, 37*a*, and the one surfaces 18, 34 to seal the overlapping portions S.

Specifically, the horn 51 is inserted into the bore portion 55 from the upper side of the finally-inserted upper resin chip 13 and the overlapping portions S are excited and pressed from the outside of the upper and lower resin chips 13, 15 between the horn 51 and the anvil 53. The press of the overlapping portion S are performed by pressing the horn 51 toward the anvil 53, and the press direction is coincident with the overlapping direction of the covered wires.

When the resin materials 11 are melt-fixed to each other by the ultrasonic vibration, the excitation is preferably performed in a direction which substantially perpendicularly intersects to the connection surface of the resin materials 11 because it provides the most excellent melt-fixing state. Therefore, the direction of the excitation of the overlapping portions S is set to a direction which crosses the confronting main melting surfaces 21, 39, the auxiliary melting surfaces 25*a*, 37*a*, and the one surfaces 18, 34 of the resin chips 13, 15, that is, it is set to be coincident with the overlapping direction of the covered wires W1, W2. With this arrangement, longitudinal vibration is produced from the horn 51.

When the overlapping portions S are pressed and excited in the above state, the cover portions 3 are first melted and the conductive wire portions 1 of the covered wires W1, W2 are exposed at the overlapping portions S between the main melting surfaces 21 and 39. At this time, the melted cover portions 3 are extruded from the center side of the main melting surfaces 21, 39 toward the outside thereof because the connection portions S are pressed from the upper and lower sides, so that the conductive wire portions 1 are more excellently exposed and surely conductively contacted with each other. Like the press direction, the direction of the excitation of the overlapping portions S is set to be coincident with the overlapping direction of the covered wires W1, W2, so that the action of extruding the melted cover portions 3 from the center side of the main melting surfaces 21, 39 to the outside thereof is promoted.

When the pressing and exciting operation on the connection portions S is further continued after the melting of the cover portions 3, the main melting portions 19, 38 are melted so that the main melting surfaces 21, 39 are melted to each other. In addition, the cover portions 3 in the vicinity of the conductive wire portion 1 are melted to the outer peripheral surface of the main melting portions 19, 38. With this operation, the outer peripheral portions of the conductively contacted conductive wire portions 1 of the connection portions S are kept to be coated with the main melting portions 19, 38.

When the resin chips 13, 15 are melted together, the upper auxiliary melting portions 25 are put into the lower auxiliary melting portions 37 formed in a groove shape. Then, the cover portions 3 of the covered wires W1, W2 introduced from the main melting portions 19, 38 are pinched by the cover portion removing portions 29, 45 of the auxiliary melting portions 25, 43 and the auxiliary melting surfaces 25*a*, 37*a* are melted together. Then the pinched cover portions 3 are melted by the cover portion removing portions 29, 45 and extruded out along a direction of the extension of the covered wires W1, W2 (see FIG. 3B). The extruded cover portions 3*a* are filled in the waterproofing groove portions 31, 47 and hardened see FIG. 3C). Consequently, at the auxiliary melting portions 25, 37 which serve as introducing portions from the resin chips 13, 15 for the covered wires W1, W2, the extruded cover portions 3*a* are hardened integrally with an outer peripheral surface of the cover portion 3 remaining in the waterproofing groove portions 31, 47, such that they function in the same manner as an elastic packing.

The aforementioned pinched cover portions 3 are extruded inside as well by the cover portion removing portions 29, 45 in the direction of the extension of the covered wires W1, W2 (see FIG. 3B). The extruded cover portions 3*b* are contained in gap portions 26, 41 such that they are hardened annually integrally with an outer peripheral surface of the remaining cover portions 3. Then, the extruded cover portions 3*b* perform the same function as an elastic packing like the waterproofing groove portions 31, 47.

When the resin chips 13, 15 are melted together, the main melting portions 19, 38, the auxiliary melting surfaces 25*a*, 37*a* and the one surfaces 18, 34 are melt-fixed. The gap portions 26, 41 which separate the main melting portions 19, 38 from the auxiliary melting portions 25, 37 form a sealed space in the melt-fixed resin chips 13, 15. Consequently, the connection portions S conductively connected with each other are sealed by the main melting portions 19, 38. At the same time, the lid body 17 and the chip body 33 also form a sealing space (gap portions 26, 41) so that the connection portions S are sealed in double forms.

According to the connection structure of the instant embodiment, the covered wires W1, W2 are overlapped with each other at the connection portions S and the connection portions S are pinched by the pair of the resin chips 13, 15. By pressing the resin chips 13, 15 from the outside to melt the cover portions 3 so as to be dispersed, the covered wires W1, W2 can be conductively connected with each other at the connection portions S. Thus, it is not necessary to remove the cover portions 3 preliminarily before conductive connection of the covered wires W1, W2 and it is possible to attain conductive connection by a simple operation.

After the covered wires W1, W2 are conductively contacted with each other at the connection portions S, the upper and lower resin chips 13, 15 are melt-fixed to seal the connection portions S. Thus, by the resin chips 13, 15 which are melted and hardened, a high mechanical strength can be obtained at the connection portions S. Then, because the connection portions S are sealed by the resin chips 13, 15, it is possible to secure a sufficient insulation performance.

Thus, it is possible to stabilize conductive stability between the covered wires W1 and W2 at the connection portions S by a high mechanical strength and a sufficient insulation performance.

The above achievement can be obtained by a relatively simple method of pinching the overlapped connection portions S by the resin chips 13, 15 and pressing and exciting the connection portions S between the horns 51 and the anvil 53 from the outside of the resin chips 13, 15. Further, this method does not restrict the shape or the like of one covered wire W1 and a mating member to be conductively connected with each other (the other covered wire W2 in the instant embodiment). Thus, this method can be applied to connection between the covered wires W1, W2 and terminals easily and provide a high availability in various applications.

According to the instant embodiment, the pair of the resin chips 13, 15 are put together from above and below in a direction of overlapping the covered wires W1, W2, the connection portions are pressed and excited between the horn 51 and the anvil 53 from outside of the resin chips 13, 15 and the direction of the pressing is set to be coincident with the overlapping direction of the covered wires W1, W2. The cover portions 3 melted when the connection portions S are pressed are extruded from the center of the resin chips 13, 15 toward outside, so that the conductive wire portions 1 are more excellently exposed thereby ensuring a secure conductive connection state. Further, because the direction of pressing to the connection portions S is set to be coincident with the overlapping direction of the covered wires W1, W2, an excellent melting condition between the resin chips 13 and 15 can be obtained and an action of extruding the cover portion 3 is enhanced.

At the auxiliary melting portions 25, 37 which serves as the introducing ends from the resin chips 13, 15 for the covered wires W1, W2, the extruded cover portions 3*a* are hardened annularly integrally with an outer peripheral surface of the remaining cover portion 3 in the waterproofing groove portions 31, 47 and serves the same function as an elastic packing. Thus, the conductive wire portions 1 of the covered wires W1, W2 at the introducing portions from the resin chips 13, 15 are covered with the cover portions 3 remaining in the waterproofing groove portions 31, 47. Further, the extruded cover portions 3*a* functioning as an elastic packing prevents entering of water or like into the resin chips 13, 15 from outside.

Further, because the auxiliary melting portions 25, 37 and the one surfaces 18, 34 as well as the main melting portions 19, 38 are melt-fixed, the melting area of the resin chips 13, 15 increases. With limiting the pressing and excitation force by the horn 51 not so as to be excessive, the melting force between the resin chips 13 and 15 can be increased so that a higher mechanical strength can be obtained.

Consequently, it is possible to achieve enhancement of the melting force between the resin chips 13 and 15 and improvement of the covering performance (enhancement of waterproof characteristics) for the conductive wire portion 1 by the resin chips 13, 15.

Further, because the waterproofing groove portions 31, 47 are formed in a smaller volume than that of the extruded cover portion 3*a*, the shape of the cover portions 3*a* to be extruded and hardened can be formed to be the same as the groove shape of the waterproofing groove portions 31, 47.

Further, because the waterproofing groove portions 31, 47 are provided at the side opposite to the main melting portion of the cover portion removing portions 29, 45, the cover portions 3*a* which are hardened in the waterproofing groove portions 31, 47 serving the same function as an elastic packing can be provided on the side opposite to the main melting portion of the introducing ends in which the covered wires W1, W2 are introduced from the resin chips 13, 15.

Further, the conductively connected connection portions S are sealed by the main melting portions 19, 38 and further sealed by a space formed by the melting of the lid body and the chip body such that the connection portions are sealed in double fashion.

Consequently, a further secure water proofing performance can be obtained.

When the resin chips 13, 15 are melt-fixed with the connection portions S pinched thereby, gap portions formed between the cover portion 3 of the covered wires W1, W2 and core wires 1*a*, and between the core wires 1*a* can be filled with the resin material 11 because the melted cover portion removing portions 29, 45 are charged in between the core wires 1*a*. As a result, waterproofing effect can be obtained inside of the covered wires W1, W2. Thus, for example, in a case in which one end of the covered wires W1, W2 is connected to a portion requiring waterproof (waterproofed portion) and the other end thereof is connected to a portion not requiring water proof (non-waterproofed portion), water or the like enters inside of the covered wires W1, W2 from the other end due to capillary phenomenon and flows inside of the covered wires W1, W2. However, water is prevented from entering to the one end by the aforementioned effect of sealing against water. Thus, it is possible to secure waterproof performance at the one end without providing the other end with water proof structure. That is, if both ends of the covered wires W1,W2 are connected to the water proofed portion and the non-waterproofed portion, it is possible to secure waterproof performance in the waterproofed portion without providing the non-waterproofed portion with a waterproofing structure, by a simple and cheap method and structure. Meanwhile, in this case, it is more advantageous to use the resin chips 13, 15 having a relatively low viscosity at the time of melting.

What is claimed is:

1. A covered wire connection structure for conductively connecting members at least one of which is a covered wire having a conductive wire portion and a cover portion formed by coating a resin around an outer periphery of the conductive wire portion, said structure being formed by overlapping said members with each other and pinching an overlapping portion of said members between a pair of resin chips, pressurizing and exciting said overlapping portion pinched by said resin chips using an ultrasonic vibration welding apparatus so as to melt and disperse said cover portion, thereby to expose the conductive wire portion and electrically conductively connect the conductive wire portion of said at least one member members with an other of said members at said overlapping portion and so as to melt-fix said pair of resin chips to seal the overlapping portion of said members with said melted resin chips, characterized in that:

said pair of the resin chips each has a main melting portion, an auxiliary melting portion, and a cover portion removing portion, said main melting portions of the resin chips are melt-fixed to each other to seal said overlapping portion as the main melting portions pinch said overlapping portion, said auxiliary melting portions of the resin chips are melt-fixed to each other so as to pinch the cover portion of said at least one covered wire introduced from said main melting portions, and said cover portion removing portion is formed in each of said auxiliary melting portions for melting said cover portion and extruding the melted cover portion in a longitudinal direction along said at least one covered wire.

2. A covered wire connection structure according to claim 1 wherein:

said pair of the resin chips each has a waterproofing groove portion, and said cover portion melted and extruded by said cover portion removing portions is filled and hardened in said waterproofing groove portions.

3. A covered wire connection structure according to claim 2 wherein:

said auxiliary melting portion comprises an auxiliary melting surface which is to be melt-fixed to a mating resin chip and a wire containing groove formed on said auxiliary melting surface so as to indent therefrom having an internal peripheral surface of substantially the same diameter as an external diameter of said covered wire;

said cover portion removing portion is formed so as to protrude from the internal peripheral surface of said wire containing groove; and said waterproofing groove portion is formed so as to indent on the internal peripheral surface of said wire containing groove along the external circumference of said at least one covered wire.

4. A covered wire connection structure according to claim 2 wherein said waterproofing groove portion is formed in a volume smaller than the volume of said cover portion extruded.

5. A covered wire connection structure according to claim 2 wherein:

said waterproofing groove portion is disposed at least on a side opposite to the main melting portion of said cover portion removing portion.

6. A covered wire connection structure according to claim 3 wherein:

one of said pair of the resin chips has a lid body shaped as a thin plate;

the main melting portion and the auxiliary melting portion of said one resin chip are disposed so as to protrude from a surface of said lid body;

the other resin chip of said pair of the resin chips has a chip body shaped as a thick plate;

the chip body has a surface which is to face said surface of said lid body when overlapped with said one resin chip and to be melt-fixed to the surface thereof;

the main melting portion and the auxiliary melting portion of said other resin chip are disposed so as to protrude from said surface of said chip body;

the auxiliary melting portion of said other resin chip is formed in groove shape containing the auxiliary melting portion of said one resin chip when overlapped with said one resin chip; and said overlapping portion is pressed by said main melting portions in a sealed space in the resin chips formed by melting said lid body and said chip body such that in said overlapping portion said members are conductively connected to each other.

7. A covered wire connection structure according to claim 1 wherein said cover portion removing portions are melted by said pressurizing and exciting of said overlapping portion and filled in between a plurality of core wires composing said conductive wire portion.

8. A covered wire connection structure for conductively connecting first and second covered wires, each of the covered wires having a conductive wire portion and a cover portion formed by coating resin around an outer periphery of the conductive wire portion, said structure being formed by overlapping said covered wires with each other and pinching an overlapping portion of said covered wires between a pair of resin chips, pressurizing and exciting said overlapping portion pinched by said resin chips using an ultrasonic vibration welding apparatus so as to melt and disperse said cover portions of the covered wires, thereby to expose the conductive wire portions of the covered wires and electrically conductively connect the conductive wire portions at said overlapping portion and so as to melt-fix said pair or resin chips to seal the overlapping portion with said melted resin chips, characterized in that:

said pair of the resin chips each has a main melting portion, an auxiliary melting portion, and a cover portion removing portion, said main melting portions of the resin chips are melt-fixed to each other to seal said overlapping portion as the main melting portions pinch said overlapping portion;

said auxiliary melting portions of the resin chips are melt-fixed to each other so as to pinch the cover portions of said covered wires introduced from said main melting portions, and each of said cover portion removing portions is formed in one of said auxiliary melting portions for melting said cover portions of said covered wires and extruding the melted cover portions in a longitudinal direction along each of said covered wires.

* * * * *